United States Patent [19]

Leone

[11] Patent Number: 4,546,229
[45] Date of Patent: Oct. 8, 1985

[54] METAL PRETREATMENT FOR RESISTANCE SPOT WELDING OF ALUMINUM

[75] Inventor: Gino L. Leone, Jonquiere, Canada

[73] Assignee: Alcan International Limited, Montreal, Canada

[21] Appl. No.: 606,354

[22] Filed: May 2, 1984

[30] Foreign Application Priority Data

Feb. 15, 1984 [CA] Canada .................................. 447465

[51] Int. Cl.[4] .......................... B23K 11/16; C25F 1/00
[52] U.S. Cl. .................................. 219/118; 219/117.1; 204/141.5
[58] Field of Search .................... 219/117.1, 91.2, 118; 204/141.5, 146

[56] References Cited

U.S. PATENT DOCUMENTS

| | | | |
|---|---|---|---|
| 2,040,618 | 5/1936 | Mason | 204/141.5 X |
| 3,584,187 | 6/1971 | Majetich et al. | 219/118 X |
| 4,365,134 | 12/1982 | Eager et al. | 219/118 |
| 4,484,060 | 11/1984 | Frye | 219/118 X |

OTHER PUBLICATIONS

R. F. Ashton and D. D. Rager, "An Arc-Cleaning Approach for Resistance Welding Aluminum", *Welding Journal*, Sep. 1976, pp. 750–757.

Patrick, "Overview of Recent Alcoa Joining R&D," in *Joining of Aluminum*, Detroit, May 12, 1983, A Welding Tech. Workshop (1983).

Primary Examiner—Roy N. Envall, Jr.
Assistant Examiner—Catherine M. Sigda
Attorney, Agent, or Firm—Cooper, Dunham, Clark, Griffin & Moran

[57] ABSTRACT

A process is described for preparing aluminum sheet for resistance welding, which increases the useful life of the welding electrodes used for welding the thus prepared sheet. The process comprises the steps of: (a) treating both surfaces of the sheet portion to be welded to remove the non-uniform mill finish oxide layer and provide clean surfaces, and (b) providing a thin oxide layer on one cleaned surface and a thicker oxide layer on the other cleaned surface of said sheet, thereby creating a differential in oxide thickness between the surfaces of the sheet and hence a differential in surface resistance.

16 Claims, 2 Drawing Figures

METAL PRETREATMENT FOR RESISTANCE SPOT WELDING OF ALUMINUM

BACKGROUND OF THE INVENTION

This invention relates to an improved method of pretreating aluminum sheet for the resistance welding thereof.

The principle of resistance spot welding is based on heat generated by electrical interfacial resistance to the flow of electric current between two or more work pieces held together under force by a pair of electrodes which act as electric conductors. Maximum heat is produced at the faying surface (the mating surface of two sheets to be joined) by a short time pulse of low-voltage high amperage current to form a fused nugget of weld metal.

The interfacial resistance of the work pieces is both the promoter of and the limiting factor of the process. Promoter because one requires interfacial resistance at the faying surface to produce a weld. Limiting factor because accumulation of heat generated by the interfacial resistance at the electrode/work piece surface after a number of welds leads to deterioration of the electrode tip. In resistance spot welding, aluminum deterioration of the electrode tip is further accelerated by the inherent physical, mechanical properties and surface condition of the work pieces.

It is a well known and accepted fact that the resistance spot welding weldability of aluminum in the as received mill finish condition is both poor and erratic. The reason for this poor and inconsistent weldability has been associated with the large variation in surface resistance which in turn is related to the nature and non-uniformity of the oxide layer and to the surface condition. One of the main goals of the aluminum industry over recent years has been to improve the resistance spot welding weldability of aluminum to a level acceptable by the automotive industry as a prerequisite for the use of aluminum in autobody sheet.

Various methods have been suggested over the years for treating the surface of aluminum in preparation for resistance spot welding. For instance, Dorsey, U.S. Pat. No. 4,097,312 issued June 27, 1978 describes the formation of an oxide coating on the aluminum surface and stabilizing this by treatment with a hot aqueous alkaline solution containing long chain carboxylic acids. An arc-cleaning technique is described by R. F. Ashton and D. D. Rager in "An Arc Cleaning Approach For Resistance Welding Aluminum", Welding Journal, September 1976, page 750. In addition, several technical papers have been presented dealing with ways and means of improving weldability.

SUMMARY OF THE INVENTION

The thrust of many of the surface treatments reported in the literature, in general terms, has been to reduce the surface resistance equally on both surfaces of the workpiece prior to welding. Although this has been shown to be an improvement over untreated surfaces, it is now believed that because the surface resistance of the workpieces in the as-received mill finished state is both the promoter and the limiting factor of the process, further improvement can be realized by purposely creating a differential in surface resistance prior to welding. This differential created between the two surfaces of the workpiece is such that the interfacial resistance at the electrode/workpiece is both low in absolute value and substantially lower than the interfacial resistance at the faying surface.

Thus, the present invention in its broadest aspect relates to a method of preparing an aluminum sheet for resistance welding in which both surfaces of the sheet portion to be welded are treated, e.g. chemically cleaned, to remove the non-uniform mill finish oxide layer. Then, a thin oxide layer is provided on one surface and a thicker oxide layer is provided on the other surface, thereby creating a differential in oxide thickness between the surfaces of the sheet and hence a differential in surface resistance.

More specifically, the thinner layer which has a lower resistance is placed next to the electrode, while the thicker layer of higher resistance becomes one of the faying surfaces. Thus, since during welding the surfaces with lower surface resistance are always in contact with electrodes and the surfaces with higher surface resistance are always in contact with each other, the high current density conditions which normally attack the electrodes are significantly reduced in the region of the electrodes while remaining high at the faying surface where the welding takes place.

Further features and advantages of the invention will be apparent from the detailed description hereinbelow set forth, together with the accompanying drawings.

DETAILED DESCRIPTION

Figure 1:
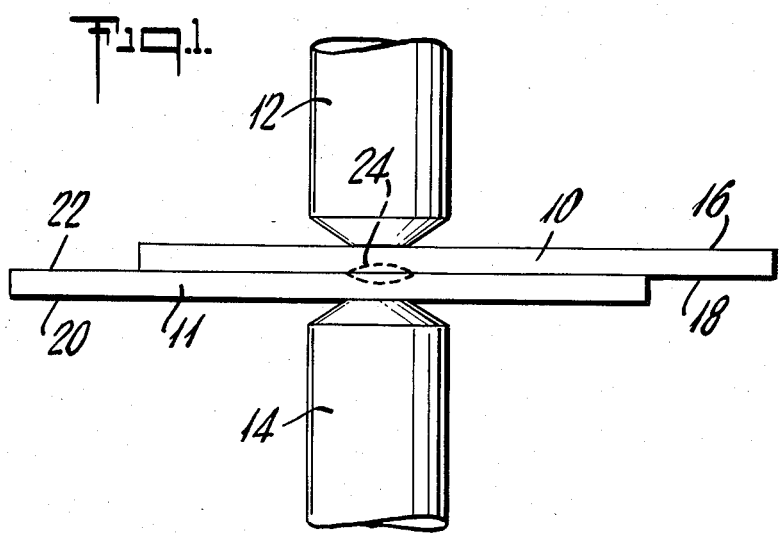
FIG. 1 is a schematic view of an exemplary arrangement for spot welding aluminum sheet members, in illustration of the method of the invention.
Figure 2:
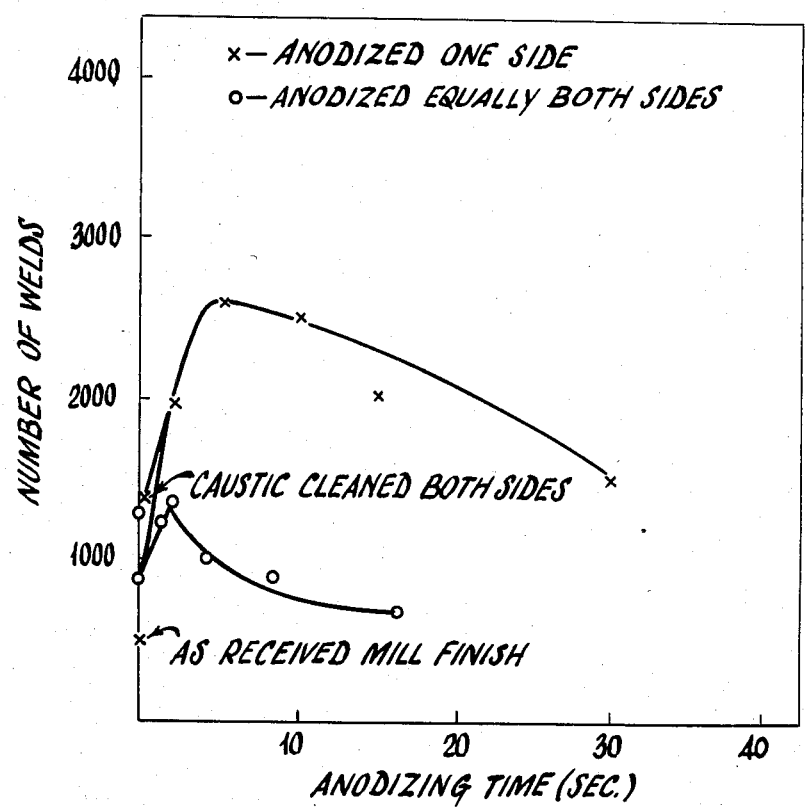
FIG. 2 is a graph comparing the results of Examples 1 and 2 set forth below.

Referring first to FIG. 1, there is shown an arrangement for joining, by spot-welding, two aluminum sheet members 10 and 11 (viewed edge-on), utilizing a pair of welding electrodes 12 and 14. Sheet 10 has a first major surface 16 in contact with the electrode 12, and a second major surface 18; sheet 11 has a first major surface 20 in contact with the electrode 14, and a second major surface 22 in contact with the major surface 18 of sheet 10. The surfaces 18 and 22 are the faying surfaces of the sheets; i.e. welding occurs at a locality 24, between the electrodes, at which these latter surfaces are in contact with each other.

In an illustrative embodiment of the method of the invention, the two sheet members 10 and 11 initially have a non-uniform mill finish oxide layer on each of their major surfaces. The first step of the method is a treatment of at least the portions of the sheet members to be welded, for effecting removal of the non-uniform mill finish oxide layer from both major surfaces of each of those sheet portions. Next follows the step of providing a very thin oxide layer on the surfaces 16 and 20 of the two sheet members, and a thicker oxide layer on the faying surfaces 18 and 22 of the sheet members, i.e. after the removal of the mill finish, thereby creating a differential in oxide thickness between the two major surfaces of each sheet member.

For welding, the sheet members 10 and 11 are now brought into resistance-joining relationship and interposed between welding electrodes, with the sheet member surfaces 16 and 20 bearing the very thin oxide layers situated to contact the welding electrodes, and the faying surfaces 18 and 20 with their thicker oxide layers brought into contact with each other, as shown. The electrodes 12 and 14 are brought into forced contact with the sheet member thus disposed, and sufficient electric current is passed between the electrodes to locally fuse the sheet members together in the region 24 and provide a resistance-welded joint.

The differential in oxide thickness may be chemically produced and is preferably created by a selective anodization treatment. According to one technique, after the aluminum sheet surfaces have been cleaned, a natural oxide layer is allowed to form on both cleaned surfaces. Then, one of these surfaces with a natural oxide layer is subjected to anodization to form a thicker oxide layer. The surface with the natural oxide layer which is not being anodized may be protected during the anodization by means of a protective electroplating layer, although it is also possible to selectively anodize only one surface without using the protective layer. The protective layer is typically in the form of a tape which serves as an electrical insulator and also protects the surface against chemical attack by the solution.

Alternatively, both cleaned surfaces may be subjected to anodization with one surface being subjected to a very light anodization to form a thin oxide layer and the other surface being subjected to a heavier anodization to form a thicker oxide layer.

Using the above techniques, the thin oxide layer preferably has a thickness of between about 20 and 200 Å and the thicker oxide layer preferably has a thickness of between about 110 and 1500 Å. This results in a differential in oxide thickness in the range of about 90 to 1480 Å. It is particularly preferred to have an oxide thickness differential in the range of about 150 to 600 Å, with the optimum being in the range of 300 to 400 Å.

Typical of the aluminum sheet to which this invention applies are alloys having the AA (Aluminum Association) designations 2036, X2038, 3004, 5052, 5182, 5454, 6009, 6010 and X6111.

The invention also relates to a welding process for the above sheets. Thus, the sheets are brought into resistance joining relationships with the very thin oxide layer situated to contact the welding electrodes. Then, the electrodes are brought into forced contact with the sheets and sufficient electric current is passed between the electrodes to locally fuse the sheets (at the faying surface) and provide a resistance welded joint.

Certain preferred embodimemts of the present invention are illustrated by the following examples.

EXAMPLE 1

A. Cleaning of Aluminum

A series of sample strips measuring 25 by 500 mm were prepared from 0.9 mm thick sheeting of aluminum alloy AA-6010-T4. The strips were subjected to vapor degreasing and then cleaned in NaOH solution at a temperature between 65° and 71° C. for 25 to 35 seconds. Thereafter, the strips were rinsed in 50% $HNO_3$ solution at a temperature in the range of 19°–25° C. for 15–25 sec. Next the strips were rinsed in continuously flowing deionized cold water and then dried using forced air.

B. Surface Protection

One surface of each strip was covered using electroplating pressure-sensitive tape, such as 3M No. 484 or a No. C-320 tape available from Arno Adhesive Tapes Inc.

C. Anodization

The exposed surfaces of the strips were anodized in 13–15 wt. % $H_2SO_4$ solution at a temperature in the range of 19°–21° C. by passing a current for preset times of 2, 5, 10, 15 and 30 seconds to a current density equivalent to 15 amps/ft$^2$. Thereafter, the strips were rinsed in flowing deionized cold water for a period of 30 seconds to 2 minutes and then dried by forced air.

The oxide thickness after each anodizing treatment was determined using the ESCA technique from three randomly selected samples. In every case oxide thickness measurements were made concurrently with surface resistance measurements.

The surface resistance measurements were taken with a Digital Micro Ohmeter (DMO) 6800 600. Two strips were placed at 90° angle to each other and held under a force of 3114N by a pair of 76 mm radiused electrodes. The same squeezing force and type of electrodes were used to make the welds. Ten readings were taken for each pair of strips for a minimum of 500 readings for a given surface treatment. Using point electric probes, readings were taken at about 25 mm from the point of electrode contact.

D. Welding Tests

Welds were made with a 150 kVA single phase AC pedal type resistance spot welding machine. The welding schedule used for the tests is given in Table 1. Each test was initiated by adjusting the % heat to produce a setup average button diameter of 4.3 mm. A Current Analyzer, Duffers Associates model 290, was used to measure the RMS current which varied between 22–25 kA depending on the surface condition of the strips being tested. The welding was conducted using class II electrodes with a radius of 76 mm and a diameter of 16 mm.

TABLE 1

| \multicolumn{2}{c}{WELDING SCHEDULE USED THROUGHOUT THE TESTS} | |
|---|---|
| Squeeze | 91 cycles |
| Weld: | 4 cycles |
| Hold: | 60 cycles |
| Off: | 60 cycles |
| Tip force: | 3114 N |
| Water flow: | 4 l/min |
| Current: | 22–25 kA (RMS) depending on surface conditions. |
| % Heat: | 62–74 |
| Transformer Tap: | Ser. 3 |
| Set up average diameter: | 4.32 mm |
| Strip size: | 25 × 500 mm |
| Electrodes: | class II radiused 16 mm dia., 75 mm radius |
| Weld spacing: | 25 mm |
| Welding rate: | 17/min |
| Strip feed: | manual |

The quality of the welds was monitored by assessing the following parameters for every 10 strips (about 170 welds). These parameters were measured to the procedure specified by the Aluminum Association:

(a) shear strength
(b) button diameter
(c) surface indentation
(d) peel test

The electrode life was defined by the number of acceptable welds made (by adhering to the specified failure criteria) with a given set of electrodes without electrode dressing and with no changes in the preset welding parameters. The test was considered concluded when any of the following conditions were met:

(1) one or more buttons failed to peel for two consecutive peel tests (5 welds/peel test), (2) the average button diameter was below the minimum value given in the Aluminum Association (AA) T-10 document, (3) the average of five single spot shear strength samples was below the minimum value given in the AA T-10 documemt, (4) a hole was blown in the sheet during welding;

(5) the electrodes pulled a plug out of the sheet.

Metallographic examination was also carried out on the electrodes tip before and after welding and on the weld microstructure as the tests progressed to assess the extent and mode of failure of the electrodes.

The overall results, as a function of the experimental conditions, are summarized in Table 2.

ized equally on both surfaces for time periods ranging up to about 16 seconds. The anodized samples were then welded by the same technique as in Example 1 and the number of welds was determined. The results for Example 1 and Example 2 are compared in FIG. 1. It will be seen that in welding samples anodized equally on both sides, the number of welds peaked at about 1400 and then dropped off very quickly. On the other hand, in welding the samples of this invention with the differential in oxide thickness, the number of welds rose to a peak of 2722 welds and then decreased quite gradually. Thus, it will be seen that the pretreating method of this invention is almost twice as effective as anodizing equally on both sides in increasing the number of welds per electrode.

EXAMPLE 3

The same aluminum alloy strips used in Example 1

TABLE 2

SUMMARY RESULTS OF RESISTANCE SPOT WELDING TESTS WITH ANODIZATION OF ONE SURFACE

| Oxide Thickness* | | Resistance** | | Differential Values | | Faying | Electrode/ Sheet | |
|---|---|---|---|---|---|---|---|---|
| Cu/Al (Å) | Al/Al (Å) | Cu/Al ($\mu\Omega$) | Al/Al ($10^3 \mu\Omega$) | Oxide Thickness (Å) | Resistance ($10^3 \mu\Omega$) | Surface Condition | Surface Condition | No. of Welds*** |
| N/A | N/A | 160 | 20 | 0 | 19.84 | Mill Finish | Mill Finish | 519 |
| 20 | 20 | 40 | 0.6 | 0 | 0.56 | Caustic Cleaned | Caustic Cleaned | 1286 |
| 20 | 165 | 40 | 29 | 145 | 28.96 | Anodized-2 sec | Caustic Cleaned | 2020 |
| 20 | 352 | 40 | 49 | 332 | 48.96 | Anodized-5 sec | Caustic Cleaned | 2722 |
| 20 | 557 | 40 | 149 | 537 | 148.96 | Anodized-10 sec | Caustic Cleaned | 2527 |
| 20 | 656 | 40 | 171 | 636 | 170.96 | Anodized-15 sec | Caustic Cleaned | 1947 |
| 20 | 1300 | 40 | 336 | 1280 | 335.96 | Anodized-30 sec | Caustic Cleaned | 1509 |

Cu/Al = electrode/sheet interface.
Al/Al = faying interface.
*Mean thickness is based on 3 readings
**Mean resistance is based on 500 readings
***Number of welds is based on one test.

For mill finish surfaces, the resistance at the electrode/sheet interface varied from 50 $\mu\Omega$ to 3,400 $\mu\Omega$ the mean value being 276 $\mu\Omega$. Following caustic cleaning, the variation was reduced to between 10 and 200 $\mu\Omega$ and the mean lowered to 31 $\mu\Omega$.

For mill finish surfaces, the resistance at the faying interface varied from 500 $\mu\Omega$ to 100,000 $\mu\Omega$ with a mean value of 20,000 $\mu\Omega$. After caustic cleaning, the resistance was reduced to between 10 and 1,300 $\mu\Omega$ and the mean was lowered to 600 $\mu\Omega$.

EXAMPLE 2

In order to demonstrate the advantages of anodizing to create a differential in oxide thickness, a comparative study was made.

Using the same procedures as in Example 1, samples of AA2036-T4 having a thickness of 0.036" were anodwere caustic cleaned and prepared in the same manner as that described in part A of Example 1. These prepared surfaces were then anodized in the same manner as Example 1 with both sides of the sample being anodized equally for one second and then rinsed and dried as described hereinbefore.

Thereafter, one surface was protected by an electroplating tape and the exposed surface was again anodized for preset times of 3, 6, 9, 14, 19 and 29 seconds, then rinsed and dried as described hereinbefore.

The samples thus prepared were subjected to welding tests using the same procedure as part D of Example 1. However, rather than continuing the welds to failure, 60–66 welds were made with each sample. The welds thus obtained were subjected to the peel test to obtain a determination of defective welds. The results obtained are shown in Table 3 below:

TABLE 3

SUMMARY RESULTS OF RESISTANCE SPOT WELDING TESTS WITH ANODIZATION OF BOTH SURFACES

| Anodization Time (seconds) | | Differential Values | | Button Diameter (inches) | Shear Strength (lbs/spot) | Percentage of Defective Welds | Total Number of Welds |
|---|---|---|---|---|---|---|---|
| Cu/Al | Al/Al[(1)] | Oxide Thickness (Å) | Surface Resistance ($10^3 \mu\Omega$) | | | | |
| 1 | 4 | 98 | 11 | 0.191 | 423 | 13 | 66 |
| 1 | 7 | 258 | 27 | 0.185 | 396 | 3 | 60 |
| 1 | 10 | 333 | 34 | 0.194 | 451 | 8 | 62 |
| 1 | 15 | 567 | 52 | 0.193 | 456 | 14 | 63 |
| 1 | 20 | 868 | 48 | 0.205 | 459 | 32 | 62 |
| 1 | 25 | 1123 | 47 | 0.201 | 478 | 33 | 66 |

TABLE 3-continued

| Anodization Time (seconds) | | Differential Values | | Button Diameter (inches) | Shear Strength (lbs/spot) | Percentage of Defective Welds | Total Number of Welds |
|---|---|---|---|---|---|---|---|
| Cu/Al | Al/Al[1] | Oxide Thickness (Å) | Surface Resistance ($10^3 \mu\Omega$) | | | | |
| 1 | 30 | 1463 | 145 | 0.204 | 448 | 39 | 63 |

SUMMARY RESULTS OF RESISTANCE SPOT WELDING TESTS WITH ANODIZATION OF BOTH SURFACES

[1]This time includes the initial 1-second anodization given to both surfaces.

It will be seen from the above table that optimum results were obtained in terms of strong welded joints with oxide thickness differentials of 258 and 333 Å. Thus, it will be seen that at the preferred thickness differentials for maximum electrode life, there is also an optimization in terms of quality of the welded joints.

It will be obvious that various modifications and improvements can be made to the invention without departing from the spirit thereof and the scope of the appended claims.

I claim:

1. A method of preparing an aluminum sheet for the resistance welding thereof, said sheet having two surfaces both initially bearing a non-uniform mill finish oxide layer, said method comprising the steps of
   (a) treating both surfaces of the sheet portion to be welded to remove the non-uniform mill finish oxide layer and provide clean surfaces, and
   (b) providing a thin oxide layer on one cleaned surface and a thicker oxide layer on the other cleaned surface of said sheet, thereby creating a differential in oxide thickness between the surfaces of the sheet and hence a differential in surface resistance.

2. The method of claim 1 wherein the differential in oxide thickness is provided by subjecting at least said other surface of said sheet to anodizing treatment.

3. The method of claim 2 wherein a thin oxide layer is formed on both cleaned surfaces and thereafter one of said thin oxide layer covered surfaces is subjected to anodizing treatment to form a thicker oxide layer.

4. The method of claim 3 wherein the surface not being subjected to anodizing treatment is protected by an electroplating tape.

5. The method of claim 2 wherein one cleaned surface is subjected to a very light anodization to form a thin oxide layer and the other cleaned surface is subjected to a heavier anodization to form a thicker oxide layer.

6. The method of claim 1 wherein the thin oxide layer has a thickness in the range of about 20 to 200 Å, and the thicker oxide layer has a thickness in the range of about 110 and 1500 Å.

7. The method of claim 6 wherein the differential in oxide thickness is in the range of about 90 to 1480 Å.

8. The method of claim 6 wherein the differential in oxide thickness is in the range of 150 to 600 Å.

9. The method of claim 6 wherein the differential in oxide thickness is in the range of about 300 to 400 Å.

10. A resistance welding process for joining aluminum sheet members each having two surfaces initially bearing a non-uniform mill finish oxide layer, said method comprising the steps of:
    (a) removing the non-uniform mill finish oxide layer from each of the two surfaces of at least the portions of the sheet members to be welded,
    (b) providing a very thin oxide layer on one surface and a thicker oxide layer on the other surface of each of the sheet members after the removal of the mill finish, thereby creating a differential in oxide thickness between the surfaces of the sheet members,
    (c) bringing said sheet members into resistance joining relationship, for interposition between welding electrodes, with the very thin oxide layers of the two sheet members respectively situated to contact the welding electrodes,
    (d) bringing said electrodes into forced contact with the sheet members, and
    (e) passing sufficient electric current between said electrodes to locally fuse said sheet members together and provide a resistance welded joint.

11. The method of claim 10 wherein at least the thicker oxide layer is formed by anodizing treatment.

12. The method of claim 10 wherein both oxide layers are formed by anodization treatments.

13. The method of claim 10 wherein the differential in oxide thickness is in the range of about 90 to 1480 Å.

14. The method of claim 13 wherein the differential in oxide thickness is in the range of 150 to 500 Å.

15. The method of claim 13 wherein the differential in oxide thickness is in the range of about 300 to 400 Å.

16. The method of claim 10 wherein the oxide thickness on the surfaces situated to contact the electrodes is in the range of about 20 to 200 Å and the oxide thickness on the surfaces to be welded is in the range of about 110 to 1500 Å.

* * * * *